United States Patent Office.

WILLIAM J. RIGNEY, OF BROOKLYN, NEW YORK, AND JUSTUS WOLFF, OF HOBOKEN, NEW JERSEY, ASSIGNORS TO HOLMES, BOOTH & HAYDENS, OF WATERBURY, CONNECTICUT.

COMPOSITION FOR INSULATING ELECTRIC WIRES.

SPECIFICATION forming part of Letters Patent No. 336,018, dated February 9, 1886.

Application filed August 15, 1885. Serial No. 174,527. (No specimens.)

*To all whom it may concern:*

Be it known that we, WILLIAM J. RIGNEY, a citizen of the United States, residing at Brooklyn, in the county of Kings and State of New York, and JUSTUS WOLFF, a subject of the United Kingdom of Great Britain and Ireland, residing at Hoboken, in the county of Hudson and State of New Jersey, have invented an Improvement in Compositions for Insulating Electric Wires, of which the following is a specification.

The invention relates to the coating of surfaces and insulation of electric conductors. The object is to provide wires, rods, and cables, or surfaces generally, but especially conducting wires, rods, or cables for telegraph, telephone, or electric-light service, and similar purposes, with a coating that shall be water-proof, weather-proof, invulnerable to or unchangeable by acids, and not liable to the attack of insects, which shall possess great elasticity and resistive power or protection to the object coated, and which shall be an efficient and practical insulator or non-conductor of electricity.

The invention consists in the combination, with an object to be coated, of an outer coating of balata, or of a compound containing balata, and an inner coating of substance or material, such as tar or tuna, preferably the latter, capable of adhesion to the surface to be coated and to the balata.

In covering surfaces for insulation it is desirable to supply a coating which, while possessing strong non-conductive qualities, or being of high resistance, shall at once further be practically applicable, useful, and available on the score of durability, protection, and comparative cost.

We have found balata—a substance closely resembling both gutta-percha and india-rubber, and which is obtained from the milky juice of the *Sapota Muelleri*—a tree growing abundantly in British Guiana and elsewhere, as in some parts of other southern countries of the Western Continent—admirably to meet every want. This substance may be applied to the surface to be coated either alone or mixed with any one or more of the following substances, viz: gutta-percha, india-rubber, tuna, asphaltum, pitch, talc, asbestus, china or other clay, barytes, pigment, earth, silica, insoluble silicates, &c., vegetable fiber, paper-pulp, powdered cork, or the like, and in one or more layers, by dissolving it or its mixture or mixtures in gasoline, linseed-oil, or other solvent, with the aid of heat, if required, a volatile solvent being preferred, and the wire being passed through the solution, or by heating it or its mixture or mixtures to about 100° centigrade, and in the resultant semi-fluid state laying it on the surface by any suitable appliance, when, upon cooling, it will form a tough insulating-coating; but when applied directly to the object to be coated it is difficult to get balata or its mixtures to adhere firmly thereto.

In order to insure firm adhesion, we find it preferable first to apply to the object to be coated one or more layers of tuna—a substance resembling gutta-percha, and obtained from the milky juice of a tree growing abundantly in Nicaragua and other parts of Central and South America—or with tar or other like sticky substance capable of adhering both to the object to be coated and to the balata. Tuna especially adheres with great tenacity both to the surface of any suitable object to be coated and to balata, and thus forms a strong bond between the two. Tuna possesses the additional advantage of being, electrically speaking, of very high resistance.

Like balata, tuna may be used alone and applied either in a solution of gasoline or other suitable solvent or in a melted state.

Instead of applying to the object to be coated tuna or a sticky substance, it may be served with a plaiting or the like of any appropriate fiber.

The balata or tuna, either or both, may be vulcanized.

By this invention a very tough, elastic, and durable coating is produced, which gives protection from chemical change or mechanical injury—as from shocks or strain—to the object coated, is not liable to attacks of marine or other animals or insects, possesses high powers of insulation, and is not too costly.

The coating above described may be employed where insulation is not the object.

Having thus fully described our invention, what we claim, and desire to secure by Letters Patent, is—

1. The combination, with an object to be coated, of an outer coating of balata, or of a mixture containing balata, and an inner coating or layer of substance or material between the balata and the object to be coated, forming a bond, substantially as described.

2. The combination, with an object to be coated, of an outer coating of balata, or of a mixture containing balata, and an inner coating or a layer of adhesive material between the balata and the object to be coated, forming a bond, substantially as described.

3. The combination, with an object to be coated, of an outer coating of balata, or of a mixture containing balata, and an inner coating of tuna joining the balata to the object to be coated.

In testimony that we claim the foregoing to be our joint invention we hereunto affix our signatures in the presence of two witnesses.

WILLIAM J. RIGNEY.
JUSTUS WOLFF.

Witnesses:
CHARLES F. WOLFF,
GEO. W. McGILL.